(12) United States Patent
Saito

(10) Patent No.: US 7,441,226 B2
(45) Date of Patent: Oct. 21, 2008

(54) METHOD, SYSTEM, APPARATUS AND PROGRAM FOR PROGRAMMING DEFECT DATA FOR EVALUATION OF RETICLE INSPECTION APPARATUS

(75) Inventor: Yasuko Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 923 days.

(21) Appl. No.: 10/838,288

(22) Filed: May 5, 2004

(65) Prior Publication Data

US 2004/0230883 A1 Nov. 18, 2004

(30) Foreign Application Priority Data

May 12, 2003 (JP) ............................. 2003-133576

(51) Int. Cl.
*G06F 17/50* (2006.01)
*G01N 21/00* (2006.01)
*G06K 9/00* (2006.01)

(52) U.S. Cl. ..................... 716/19; 356/237.1; 382/144; 382/149

(58) Field of Classification Search .............. 356/237.1; 382/144, 149; 716/19–21; 430/5
See application file for complete search history.

(56) References Cited

U.S. PATENT DOCUMENTS

| | | | |
|---|---|---|---|
| 6,466,314 B1 * | 10/2002 | Lehman | 356/237.1 |
| 6,873,720 B2 * | 3/2005 | Cai et al. | 382/149 |
| 7,133,548 B2 * | 11/2006 | Kenan et al. | 382/144 |
| 7,254,251 B2 * | 8/2007 | Cai et al. | 382/100 |
| 2003/0086081 A1 * | 5/2003 | Lehman | 356/237.1 |

FOREIGN PATENT DOCUMENTS

| | | |
|---|---|---|
| JP | 2000-258349 A | 9/2000 |
| JP | 2002-048722 A | 2/2002 |

* cited by examiner

*Primary Examiner*—Stacy A Whitmore
(74) *Attorney, Agent, or Firm*—Sughrue Mion, PLLC

(57) ABSTRACT

A program defect condition is input to a defect-data programming apparatus which programs defect data for evaluation of a reticle inspection apparatus, thereby generating program defect information, program-defect-information-free source CAD data is converted to CAD data of a format with which the CAD data is input to the reticle inspection apparatus, and the program defect information is embedded into the converted CAD data, thereby generating program-defect-information-present CAD data for inspection apparatus. The program-defect-information-present CAD data for inspection apparatus is input to the reticle inspection apparatus together with a program-defect-information-free reticle produced based on the program-defect-information-free source CAD data, for execution of sensitivity evaluation. Program defect information needed to execute sensitivity evaluation of the reticle inspection apparatus is generated on that CAD data which is input to the reticle inspection apparatus, not on a real reticle.

6 Claims, 4 Drawing Sheets

METHOD, SYSTEM, APPARATUS AND PROGRAM FOR PROGRAMMING DEFECT DATA FOR EVALUATION OF RETICLE INSPECTION APPARATUS

BACKGROUND OF THE INVENTION

1. Field of the Invention

The present invention relates to a method, a system, an apparatus and a program each of which programs defect data for evaluation of a reticle inspection apparatus and performs sensitivity evaluation efficiently by generating program defect information, needed to execute sensitivity evaluation of the reticle inspection apparatus, on that CAD data which is input to the reticle inspection apparatus, not on a real reticle.

2. Description of the Related Art

Conventional defect inspection apparatuses for use in the semiconductor fabrication process generally employ an inspection scheme of comparing the characteristics of an image generated based on design data called CAD data with the characteristics of a real image and detecting difference as defects (flaw points).

Such a defect inspection apparatus uses a sample in which defects are intentionally programmed for the purpose of objectively evaluating the performance of the apparatus. This sample is called a sample with program defects. To measure the performance of the defect inspection apparatus, a sample is programmed with defects of various characteristic types and sizes. For example, one sample has ten types of defects and twenty different sizes for each type from a small defect to a large one. The defect inspection apparatus inspects the sample and its performance is evaluated by the level of difficulty of a defect which it can detect. The evaluation process is generally called "sensitivity evaluation".

The operation of executing the conventional sensitivity evaluation process is described below referring to FIGS. 1 and 2. The broken-lined blocks in FIG. 2 are procedures that are carried out manually or so, not procedures that are executed by a data processing unit 200.

First, to execute sensitivity evaluation, a reticle 500 programmed with the program defect information is prepared separate from a normal reticle for inspection. A "reticle" is a photomask which is used in exposing a circuit pattern on a wafer in the fabrication process for a semiconductor device. Preparation of the reticle 500 requires source CAD data 100 having program defect information (step S103 in FIG. 2). The source CAD data 100 is hereinafter referred to as "program-defect-information-present source CAD data 100".

As a comparison target is prepared source CAD data 301 that is the program-defect-information-present source CAD data 100 from which the program defect information is removed (step S104 in FIG. 2). The source CAD data 301 is hereinafter referred to as "program-defect-information-free source CAD data 301".

To execute normal inspection, by way of contrast, a reticle having no program defects (hereinafter referred to as "program-defect-information-free reticle") and its source CAD data are prepared (step S102 in FIG. 2). This requires to design whether to execute normal inspection or sensitivity evaluation prior to the fabrication of the reticle (step S101 in FIG. 2).

The prepared CAD data, regardless of whether it is used in normal inspection or sensitivity evaluation, is converted to data 302, which can be input to the reticle inspection apparatus and is in turn output (steps S105 and S106 in FIG. 2).

Techniques relating to the reticle inspection apparatus that is used in the conventional semiconductor fabrication process or so include one which can inspect the outer appearance of a photomask under the same conditions as involved in actual exposure of a photomask on a wafer by a stepper (see, for example, Japanese Patent Laid-Open Publication No. 2000-258349) and one which can easily set parameters for the defect inspection apparatus (see, for example, Japanese Patent Laid-Open Publication No. 2002-048722).

The execution of the conventional sensitivity evaluation however has the following problems that cannot be overcome by the conventional defect inspection apparatus.

The first problem of the conventional sensitivity evaluation is an extreme difficulty in programming defects of a small size which are worth evaluating. The micronization of semiconductor design rules demands that the defect inspection apparatus should detect smaller defects. Evaluation of state-of-the-art inspection apparatuses demands that the size of program defects should be small enough to be able to evaluate the optimal performance. The smaller the size is, the harder it becomes to accurately program defects, so that defects of a desirable size for evaluation are not often obtained.

The second problem is that a work of measuring the sizes of programmed defects takes considerable time and labor, making it difficult to acquired objective measurements. To properly evaluate the performance of the defect inspection apparatus, it is necessary to accurately identify the sizes of detected defects. The smaller the size of a program defect is, however, the more likely it is to cause a factitious fluctuation in measurements. Unless measurements are taken in the right environment under the precise decision conditions, objective defects-programmed samples cannot be obtained. This requires a high level of measuring technique and sophisticated environment, and the time required for the measuring task becomes longer every year.

The third problem is that the diversification of semiconductor design makes it necessary to prepare a lot of reticles having various kinds of defect information different from one another in the characteristics of program defects to be evaluated. This problem, like the first problem, leads to the difficulty in acquiring samples with accurately programmed defects. An increase in the types of program defects means an increase in the number of defects to be measured, which leads to the second problem.

The fourth problem is that the diversification of semiconductor design diversifies the characteristics of the background where defects are placed as well as the types of the characteristics of defects themselves. A defect-programmed sample is exclusive for sensitivity evaluation and cannot be used as a product. This makes it substantially difficult to prepare fabrications of different types that cover the variation of products.

The fifth problem lies in the necessity to prepare two kinds of CAD data, namely CAD data for fabricating a defect-programmed sample and CAD data having no program defect information for sensitivity evaluation. In sensitivity evaluation, the real image of a defect-present sample should be compared with an image generated from CAD data having no defect information to detect differences. A process up to the execution of sensitivity evaluation requires longer time than the normal inspection process by the time needed to prepare data.

SUMMARY OF THE INVENTION

Accordingly, it is an object of the present invention to provide a method, a system, an apparatus and a program each of which programs defect data for evaluation of a reticle inspection apparatus and performs sensitivity evaluation efficiently by generating program defect information, needed to execute sensitivity evaluation of the reticle inspection apparatus, on that CAD data which is input to said reticle inspection apparatus, not on a real reticle.

According to the first aspect of the present invention, a method of programming defect data for evaluation of a reticle inspection apparatus comprises the steps of:

inputting a program defect condition to a defect-data programming apparatus which programs defect data for evaluation of the reticle inspection apparatus, thereby generating program defect information;

converting program-defect-information-free source CAD data to CAD data of a format with which the CAD data is input to the reticle inspection apparatus and embedding the program defect information into the converted CAD data, thereby generating program-defect-information-present CAD data for inspection apparatus; and inputting the program-defect-information-present CAD data for inspection apparatus and a program-defect-information-free reticle produced based on the program-defect-information-free source CAD data, to the reticle inspection apparatus to execute sensitivity evaluation.

Program defect information needed to execute sensitivity evaluation of the reticle inspection apparatus is generated on that CAD data which is input to the reticle inspection apparatus, not on a real reticle.

In this case, for example, the program defect condition may include at least a number of defects to be programmed, and coordinates, a size and a shape of each defect.

According to the second aspect of the present invention, a system for programming defect data for evaluation of a reticle inspection apparatus comprises:

a defect-data programming apparatus which programs defect data for evaluation of the reticle inspection apparatus; and a reticle inspection apparatus.

The defect-data programming apparatus includes:

a program-defect-information generating unit which inputs a program defect condition to the defect-data programming apparatus, thereby generating program defect information, and a data conversion unit which converts program-defect-information-free source CAD data to CAD data of a format with which the CAD data is input to the reticle inspection apparatus and embeds the program defect information into the converted CAD data, thereby generating program-defect-information-present CAD data for inspection apparatus.

The reticle inspection apparatus receives the program-defect-information-present CAD data for inspection apparatus and executing sensitivity evaluation based on the program-defect-information-present CAD data for inspection apparatus and a program-defect-information-free reticle produced based on the program-defect-information-free source CAD data.

Accordingly, the system generates program defect information, needed to execute sensitivity evaluation of the reticle inspection apparatus, on that CAD data which is input to the reticle inspection apparatus, not on a real reticle.

According to the third aspect of the present invention, a defect-data programming apparatus for programming defect data for evaluation of a reticle inspection apparatus comprises:

a program-defect-information generating unit which inputs a program defect condition to the defect-data programming apparatus, thereby generating program defect information; and a data conversion unit that converts program-defect-information-free source CAD data to CAD data of a format with which the CAD data is input to the reticle inspection apparatus and embeds the program defect information into the converted CAD data, thereby generating program-defect-information-present CAD data for inspection apparatus, which is input to the reticle inspection apparatus together with a program-defect-information-free reticle produced based on the program-defect-information-free source CAD data, for execution of sensitivity evaluation.

Accordingly, program defect information, needed to execute sensitivity evaluation of the reticle inspection apparatus, is generated on that CAD data which is input to the reticle inspection apparatus, not on a real reticle.

In this case, for example, the program defect condition may include at least a number of defects to be programmed, and coordinates, a size and a shape of each defect.

According to the fourth aspect of the present invention, a program of programming defect data for evaluation of a reticle inspection apparatus allows a defect-data programming apparatus to receive a program defect condition, thereby generating program defect information, convert program-defect-information-free source CAD data to CAD data of a format with which the CAD data is input to the reticle inspection apparatus and embedding the program defect information into the converted CAD data, thereby generating program-defect-information-present CAD data for inspection apparatus, and output the program-defect-information-present CAD data for inspection apparatus.

The program-defect-information-present CAD data for inspection apparatus is input to the reticle inspection apparatus together with a program-defect-information-free reticle produced based on the program-defect-information-free source CAD data, for execution of sensitivity evaluation.

Accordingly, the program generates program defect information, needed to execute sensitivity evaluation of the reticle inspection apparatus, on that CAD data which is input to the reticle inspection apparatus, not on a real reticle.

According to the invention, it is necessary to program defects on a real reticle, so that information of a defect even of a small size can be programmed accurately.

As the size of a programmed defect can be computed by the designated conditions and is not on a real reticle, a work of measuring the defect size can be eliminated.

Further, as defect programming is done by merely manipulating data, program defects having multifarious characteristics can be prepared easily.

In addition, a reticle for normal inspection which does not have programmed defects can be used in sensitivity evaluation, thus making it possible to select an arbitrary pattern used for products as the background pattern for program defects.

Because a reticle and CAD data both exclusive for sensitivity evaluation need not be prepared, it is possible to considerably reduce the preparation cost and time for sensitivity evaluation.

Furthermore, a program of programming defect data for evaluation of a reticle inspection apparatus can achieve the function of generating program defect information and the function of converting program-defect-information-free source CAD data to CAD data of a format with which the CAD data is input to the reticle inspection apparatus by sending predetermined commands to the individual components of a computer.

Accordingly, those functions can be realized by a defect-data programming apparatus for programming defect data for evaluation of a reticle inspection apparatus, which is achieved by the cooperation of a program of programming defect data for evaluation of a reticle inspection apparatus and a computer.

DETAILED DESCRIPTION OF THE PREFERRED EMBODIMENT

A preferred embodiment of the present invention will be described below with reference to the accompanying drawings. To begin with, the structure of the embodiment of the present invention is discussed referring to FIG. 3, which is a block diagram illustrating the structure of a system for programming defect data for evaluation of a reticle inspection apparatus (hereinafter referred to as "defect-data programming system") according to the embodiment.

Figure 1:
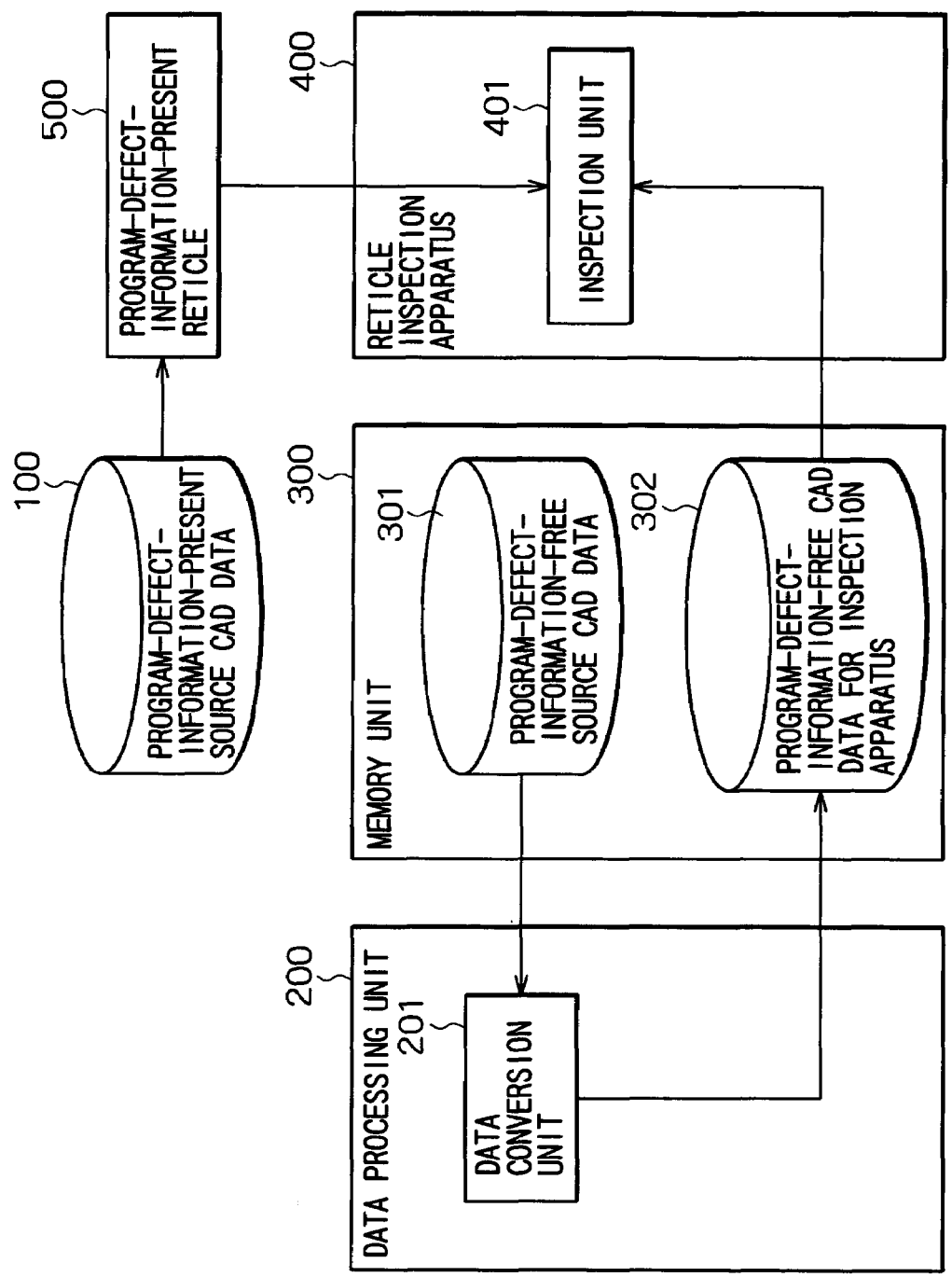
FIG. 1 is a block diagram illustrating the structure of a conventional system for programming defect data for evaluation of a reticle inspection apparatus.
Figure 2:
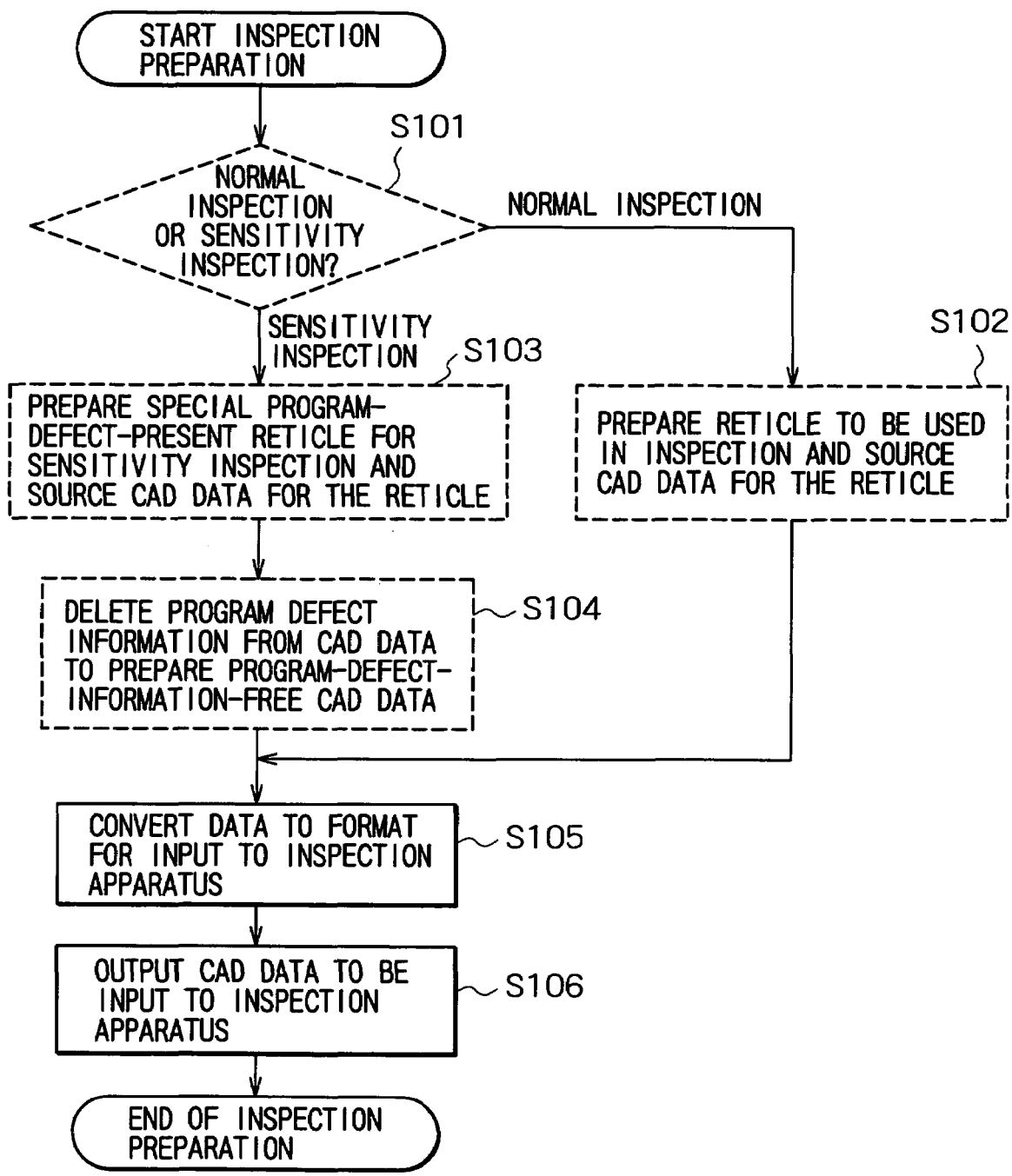
FIG. 2 is a flowchart illustrating the procedures of a process which is performed by the conventional system in FIG. 1.
Figure 3:
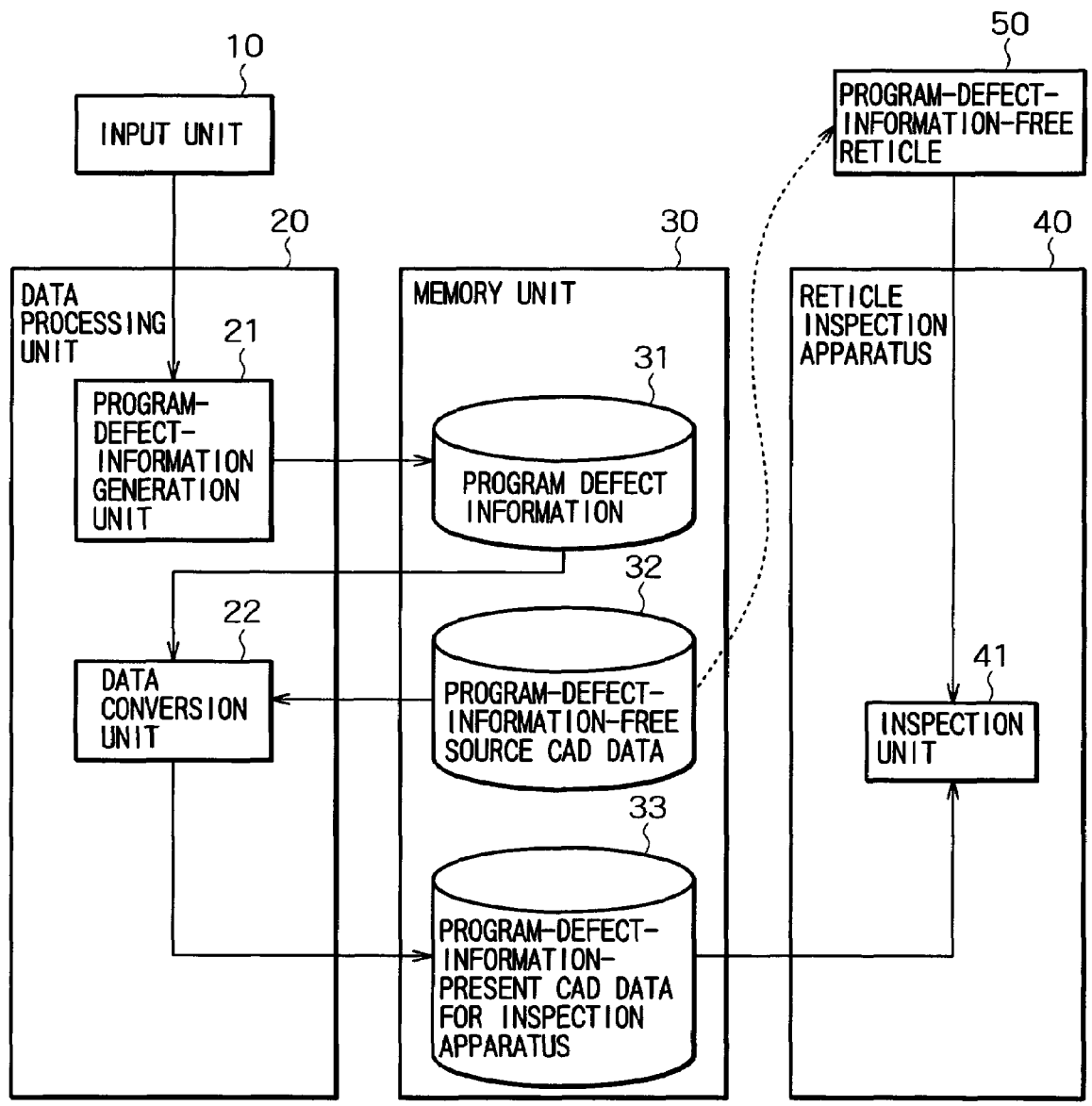
FIG. 3 is a block diagram illustrating the structure of a system for programming defect data for evaluation of a reticle inspection apparatus according to one embodiment of the invention.

As shown in FIG. 3, the defect-data programming system according to the embodiment has an input unit 10, a data processing unit 20, a memory unit 30 and a reticle inspection apparatus 40. The structure that includes all the input unit 10, the data processing unit 20 and the memory unit 30 may be called a defect-data programming apparatus for programming defect data for evaluation of a reticle inspection apparatus. FIG. 3 shows a reticle 50 which has no program defect information (hereinafter referred to as "program-defect-information-free reticle 50") and which is set as a sample for inspection of the reticle inspection apparatus 40.

The defect-data programming apparatus is an information processing apparatus, such a work station or a server, is connected to the reticle inspection apparatus 40 by a cable or wirelessly, to send generated CAD data for inspection apparatus to the reticle inspection apparatus 40.

The input unit 10 in the defect-data programming apparatus is a device, such as a keyboard or a mouse, which is connected to the data processing unit 20 to input information.

The data processing unit 20 in the defect-data programming apparatus has a program-defect-information generation unit 21 and a data conversion unit 22.

The program-defect-information generation unit 21 generates program defect information 31 based on the program defect conditions that are input from the input unit 10 and stores the program defect information 31 in the memory unit 30.

The program defect information 31 may be information including the number of defects to be programmed, and the coordinates, size and shape of each defect. Those pieces of information are input from the input unit 10 as the program defect conditions. The program-defect-information generation unit 21 generates the program defect information 31 as a file containing those pieces of information.

The data conversion unit 22 converts source CAD data 32 having no program defect information (hereinafter referred to as "program-defect-information-free source CAD data 32") to data of the format with which the CAD data is input to the inspection apparatus, and embeds defect information in the converted, output CAD data based on the program defect information 31, thereby generating CAD data 33 for inspection apparatus (hereinafter referred to as "program-defect-information-present CAD data 33"). The data conversion unit 22 stores the program-defect-information-present CAD data 33 for inspection apparatus in the memory unit 30 and sends the CAD data 33 to the reticle inspection apparatus 40.

Embedding of defect information in the CAD data is carried out by recording each defect, defined in the program defect information 31, in the converted CAD data at the defined coordinates and with the defined size and shape.

Normally, the CAD data formation for fabricating a reticle differs for each type of the fabrication system. To embed defect information directly in the program-defect-information-free source CAD data 32, therefore, it is necessary to cope with the formats of all reticle inspection apparatuses. The embodiment can embed defect information without depending on the format of the source CAD data 32 by embedding defect information in the input CAD data for the inspection apparatus.

The memory unit 30 in the defect-data programming apparatus has the program defect information 31, the program-defect-information-free source CAD data 32 and the program-defect-information-present CAD data 33 for inspection apparatus. The source CAD data 32 in use is one which has been generated beforehand and stored in the memory unit 30. The program-defect-information-free reticle 50 is generated based on the source CAD data 32.

The memory unit 30 can be so designed as to reside together with the data processing unit 20 in a single information processing apparatus, or may be an external memory unit or so connected to the data processing unit 20. The storage sections for the program defect information 31, the program-defect-information-free source CAD data 32 and the program-defect-information-present CAD data 33 for inspection apparatus should not necessarily be provided in a single memory unit 30 but may be so designed as to be dispersed in plural memory units.

The reticle inspection apparatus 40 has an inspection unit 41 that inspects defects which occur when a reticle is generated, and can be of a conventional well-known type. For example, an inspection apparatus capable of inspecting reticles for 0.15 µm or 0.13 µm rules.

Figure 4:
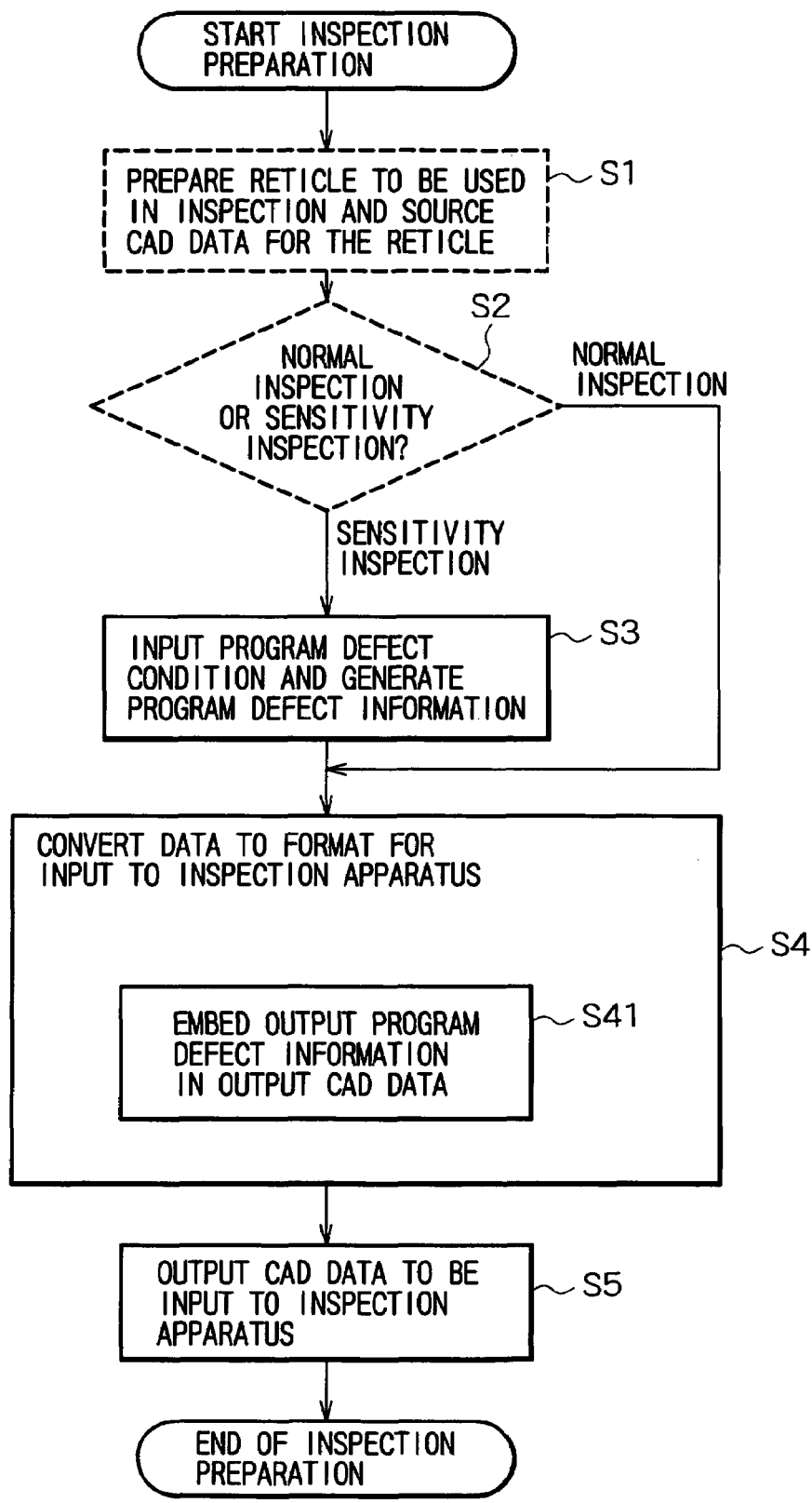
FIG. 4 is a flowchart illustrating the procedures of a process which is performed by the system according to the embodiment of the invention in FIG. 3.

Next, the procedures of a process which is carried out by the defect-data programming system according to the embodiment are described referring to FIG. 4.

FIG. 4 is a flowchart illustrating the procedures of the process performed by the defect-data programming system according to the embodiment. The broken-lined blocks in FIG. 4 are procedures that are carried out manually or so by a worker or the like who embeds data for evaluation, not procedures that are executed by the defect-data programming apparatus.

First, the reticle 50 to be used in inspection and the CAD data 32 used at the time of producing the reticle 50 are prepared (step S1). The reticle 50 is set in the reticle inspection apparatus 40 for inspection. The CAD data 32 is input to and stored in the defect-data programming apparatus.

Further, it is determined whether the inspection is for sensitivity evaluation or normal evaluation (step S2). In case of normal evaluation, the defect-data programming apparatus is allowed to convert the CAD data 32 to data of the format with which the CAD data is input to the inspection apparatus, without making special inputs or so, and output CAD data to be input to the inspection apparatus (step S4 and step S5).

To execute sensitivity evaluation, the defect-data programming apparatus receives the program defect conditions from the input unit 10 and generates the program defect information 31 by means of the program-defect-information generation unit 21 (step S3).

Then, the defect-data programming apparatus causes the data conversion unit 22 to perform format conversion of the CAD data 32 (step S4) and outputs resultant CAD data to be input to the inspection apparatus (step S5).

Generally, the apparatus which fabricates a reticle and the reticle inspection apparatus differ from each other in data format in use, so that the format of CAD data used at the time of fabricating a reticle should be converted to the data format that can be input to the reticle inspection apparatus. In the data conversion, the data conversion unit 22 reads the program defect information 31, generated beforehand, and embeds the program defect information 31 in the output CAD data 33 only when sensitivity evaluation is performed (step S41). On in the case of executing sensitivity evaluation, therefore, program defect information is embedded in the output CAD data to be input to the inspection apparatus.

The CAD data to be input to the inspection apparatus can be automatically input to the reticle inspection apparatus 40 from the defect-data programming apparatus inspection apparatus via a communication circuit, such as an LAN circuit or an exclusive circuit, by connecting those apparatuses together by the communication circuit.

The CAD data to be input to the inspection apparatus, which is generated by the defect-data programming apparatus, can be stored in a storage medium through which the CAD data is input to the reticle inspection apparatus 40.

As described above, the defect-data programming system of the embodiment eliminates to need to program defects on a real reticle, so that information of a defect even of a small size can be programmed accurately.

As the size of a programmed defect can be computed by the designated conditions and is not on a real reticle, a work of measuring the defect size can be eliminated.

Further, as defect programming is done by merely manipulating data, program defects having multifarious characteristics can be prepared easily.

In addition, a reticle for normal inspection which does not have programmed defects can be used in sensitivity evaluation, thus making it possible to select an arbitrary pattern used for products as the background pattern for program defects.

Because a reticle and CAD data both exclusive for sensitivity evaluation need not be prepared, it is possible to considerably reduce the preparation cost and time for sensitivity evaluation.

The generation of program defect information and the data conversion to the format suitable for data input to the inspection apparatus are executed by the program of programming defect data for evaluation of a reticle inspection apparatus.

This program sends commands to the individual components of a computer to execute predetermined processes, such as the generation of program defect information and the data conversion to the format suitable for data input to the inspection apparatus.

Accordingly, those functions can be realized by, for example, a defect-data programming apparatus for programming defect data for evaluation of a reticle inspection apparatus, which is constructed by the cooperation of a program of programming defect data for evaluation of a reticle inspection apparatus and a computer.

The defect-data programming program can be stored not only in a ROM or a hard disk in a computer but also in a computer-readable recording medium, such as an external memory unit or a portable recording medium.

An "external memory unit" is a memory extending device which holds a recording medium, such as a magnetic disk, and is externally connected to, for example, the defect-data programming apparatus or so. A "portable recording medium" is a recording medium which can be loaded into a recording medium drive unit and can be carried around. The portable recording medium may be a CD-ROM, a flexible disk, a memory card or a magneto-optical disk.

The program recorded on the recording medium is loaded into the RAM in the computer and is run by the CPU. The execution of the program can achieve the functions of the defect-data programming apparatus.

In case where the defect-data programming program is loaded into a computer, a defect-data programming program held in another computer can be downloaded into the local RAM or an external memory unit using the communication line.

The downloaded program is likewise run by the CPU to achieve the generation of program defect information and the data conversion to the format suitable for data input to the inspection apparatus in the embodiment.

The invention is not limited to the embodiment but can of course modified in various other forms within the spirit or scope of the invention.

For instance, the invention can be modified to integrate the defect-data programming apparatus with the reticle inspection apparatus, as needed.

What is claimed is:

1. A method of programming defect data for evaluation of a reticle inspection apparatus, comprising the steps of:
    inputting a program defect condition to a defect-data programming apparatus which programs defect data for evaluation of said reticle inspection apparatus, thereby generating program defect information;
    converting program-defect-information-free source CAD data to CAD data of a format with which the CAD data is input to said reticle inspection apparatus and embedding said program defect information into said converted CAD data, thereby generating program-defect-information-present CAD data for inspection apparatus; and
    inputting said program-defect-information-present CAD data for inspection apparatus and a program-defect-information-free reticle produced based on said program-defect-information-free source CAD data, to said reticle inspection apparatus to execute sensitivity evaluation,
    whereby program defect information needed to execute sensitivity evaluation of said reticle inspection apparatus is generated on that CAD data which is input to said reticle inspection apparatus, not on a real reticle.

2. The method according to claim 1, wherein said program defect condition includes at least a number of defects to be programmed, and coordinates, a size and a shape of each defect.

3. A system for programming defect data for evaluation of a reticle inspection apparatus, comprising:
    a defect-data programming apparatus which programs defect data for evaluation of said reticle inspection apparatus; and
    a reticle inspection apparatus,
    said defect-data programming apparatus including
    a program-defect-information generating unit which inputs a program defect condition to said defect-data programming apparatus, thereby generating program defect information, and a data conversion unit which converts program-defect-information-free source CAD data to CAD data of a format with which the CAD data is input to said reticle inspection apparatus and embeds said program defect information into said converted CAD data, thereby generating program-defect-information-present CAD data for inspection apparatus, said reticle inspection apparatus receiving said program-defect-information-present CAD data for inspection apparatus and executing sensitivity evaluation based on said program-defect-information-present CAD data for inspection apparatus and a program-defect-information-free reticle produced based on said program-defect-information-free source CAD data, whereby said system generates program defect information, needed to execute sensitivity evaluation of said reticle inspection apparatus, on that CAD data which is input to said reticle inspection apparatus, not on a real reticle.

4. A defect-data programming apparatus for programming defect data for evaluation of a reticle inspection apparatus, comprising:

a program-defect-information generating unit which inputs a program defect condition to said defect-data programming apparatus, thereby generating program defect information; and a data conversion unit that converts program-defect-information-free source CAD data to CAD data of a format with which the CAD data is input to said reticle inspection apparatus and embeds said program defect information into said converted CAD data, thereby generating program-defect-information-present CAD data for inspection apparatus, which is input to said reticle inspection apparatus together with a program-defect-information-free reticle produced based on said program-defect-information-free source CAD data, for execution of sensitivity evaluation, whereby program defect information, needed to execute sensitivity evaluation of said reticle inspection apparatus, is generated on that CAD data which is input to said reticle inspection apparatus, not on a real reticle.

5. The defect-data programming apparatus according to claim 4, wherein said program defect condition includes at least a number of defects to be programmed, and coordinates, a size and a shape of each defect.

6. A program of programming defect data for evaluation of a reticle inspection apparatus, for allowing a defect-data programming apparatus to receive a program defect condition, thereby generating program defect information, convert program-defect-information-free source CAD data to CAD data of a format with which the CAD data is input to said reticle inspection apparatus and embedding said program defect information into said converted CAD data, thereby generating program-defect-information-present CAD data for inspection apparatus, and output said program-defect-information-present CAD data for inspection apparatus, which is input to said reticle inspection apparatus together with a program-defect-information-free reticle produced based on said program-defect-information-free source CAD data, for execution of sensitivity evaluation, whereby said program generates program defect information, needed to execute sensitivity evaluation of said reticle inspection apparatus, on that CAD data which is input to said reticle inspection apparatus, not on a real reticle.

* * * * *